United States Patent [19]
Baris

[11] Patent Number: 5,822,791
[45] Date of Patent: Oct. 20, 1998

[54] PROTECTIVE MATERIAL AND METHOD

[75] Inventor: Robert P. Baris, Cleveland, Ohio

[73] Assignee: Whizard Protective Wear Corp, Birmingham, Ohio

[21] Appl. No.: 668,695

[22] Filed: Jun. 24, 1996

[51] Int. Cl.$^6$ .................................................. F41H 1/02
[52] U.S. Cl. .................................. 2/2.5; 2/161.6; 2/167; 112/16; 156/148; 427/385.5; 427/387; 427/389.9; 428/102; 428/103; 428/198; 428/902; 442/260; 442/304; 442/318
[58] Field of Search ...................................... 428/102, 103, 428/902, 198; 442/304, 318, 260; 2/161.6, 2.5, 167; 156/148, 290, 291; 427/389.9, 385.5, 387; 112/16

[56] References Cited

U.S. PATENT DOCUMENTS

| | | |
|---|---|---|
| 831,108 | 9/1906 | Ryder . |
| 2,126,723 | 8/1938 | Bodle . |
| 2,165,296 | 7/1939 | Oass . |
| 2,313,058 | 3/1943 | Francis, Jr. . |
| 2,327,625 | 8/1943 | Dickson . |
| 2,357,636 | 9/1944 | David . |
| 2,373,940 | 4/1945 | Beall . |
| 2,657,391 | 11/1953 | Crandon . |
| 2,737,663 | 3/1956 | Harris . |
| 2,849,786 | 9/1958 | Ashley et al. . |
| 2,864,091 | 12/1958 | Schneider . |
| 2,988,457 | 6/1961 | Gatcomb . |
| 2,999,764 | 9/1961 | Rhoads . |
| 3,026,531 | 3/1962 | Holaday . |
| 3,087,699 | 4/1963 | Foster . |
| 3,277,564 | 10/1966 | Webber et al. . |
| 3,288,175 | 11/1966 | Valko . |
| 3,490,224 | 1/1970 | Bourgeas . |
| 3,548,413 | 12/1970 | Jackson . |
| 3,572,397 | 3/1971 | Austin . |
| 3,594,817 | 7/1971 | Kelly . |
| 3,633,216 | 1/1972 | Schonholtz . |
| 3,699,590 | 10/1972 | Webber et al. . |
| 3,732,575 | 5/1973 | Pakulak . |
| 3,871,946 | 3/1975 | Romanski et al. . |
| 3,883,898 | 5/1975 | Byrnes, Sr. ................................. 2/167 |
| 3,916,448 | 11/1975 | Hamel ........................................ 2/161 |
| 3,945,049 | 3/1976 | Barlow ....................................... 2/169 |
| 3,953,893 | 5/1976 | Byrnes, Sr. ................................. 2/51 |
| 3,986,530 | 10/1976 | Maekawa .......................... 139/425.12 |
| 4,001,895 | 1/1977 | Cohen ....................................... 2/158 |
| 4,004,295 | 1/1977 | Byrnes, Sr. ................................ 2/158 |

(List continued on next page.)

FOREIGN PATENT DOCUMENTS

| | | |
|---|---|---|
| 1539816 | 8/1968 | France . |
| 7730173 | 5/1978 | France . |
| 1610495 | 1/1971 | Germany . |
| 2336200 | 2/1974 | Germany . |
| 3023990 | 1/1982 | Germany . |
| 187327 | 10/1922 | United Kingdom . |
| 1401378 | 7/1973 | United Kingdom . |
| 2018323 | 10/1979 | United Kingdom . |

OTHER PUBLICATIONS

*Textile Applications of Metal Fibers*, Gerald Barry, Modern Textiles Magazine, pp. 53–56, Mar. 20, 1967.
*Textile Applications for Fine Metallic Filaments*, C. Allen, Modern Textiles Magazine, pp. 60–61, Mar. 1974.
*Metal Fibers*, Webber, Modern Textiles, pp. 72–75, May 1966.
Reexamination Certificate B1 4526828, issued Apr. 4, 1989.

*Primary Examiner*—James J. Bell
*Attorney, Agent, or Firm*—Watts Hoffmann Fisher & Heinke

[57] ABSTRACT

The present invention provides a protective material comprising a base layer comprising cut resistant yarn, an intermediate layer comprising natural fiber and an outer layer comprising a flexible, elastomeric material impervious to liquid. The intermediate layer is bonded to the elastomeric material, while the cut resistant yarn in the base layer remains substantially free of encapsulation by the elastomeric material. The intermediate layer is joined to said base layer at one or more locations, preferably by selective strike through of limited amounts of the elastomeric material to encapsulate yarn in the base layer.

32 Claims, 1 Drawing Sheet

U.S. PATENT DOCUMENTS

| | | | |
|---|---|---|---|
| 4,016,714 | 4/1977 | Crandall et al. . | |
| 4,172,293 | 10/1979 | Vistins | 2/169 |
| 4,218,779 | 8/1980 | Hart et al. | 2/168 |
| 4,302,851 | 12/1981 | Adair . | |
| 4,356,569 | 11/1982 | Sullivan | 2/2.5 |
| 4,359,783 | 11/1982 | Andrews | 2/161 R |
| 4,384,449 | 5/1983 | Byrnes, Sr. et al. | 57/210 |
| 4,433,439 | 2/1984 | Sidman et al. | 2/161 R |
| 4,454,611 | 6/1984 | Tschirch et al. | 2/161 R |
| 4,470,251 | 9/1984 | Bettcher . | |
| 4,526,828 | 7/1985 | Fogt et al. . | |
| 4,623,574 | 11/1986 | Harpell et al. . | |
| 4,651,514 | 3/1987 | Collett . | |
| 4,737,401 | 4/1988 | Harpell et al. . | |
| 4,742,578 | 5/1988 | Seid . | |
| 4,847,918 | 7/1989 | Sturm . | |
| 4,850,050 | 7/1989 | Droste et al. . | |
| 4,864,852 | 9/1989 | Boone | 73/159 |
| 4,912,781 | 4/1990 | Robins et al. . | |
| 5,070,540 | 12/1991 | Bettcher et al. . | |
| 5,119,512 | 6/1992 | Dunbar et al. . | |
| 5,224,363 | 7/1993 | Sutton . | |
| 5,349,705 | 9/1994 | Ragan . | |
| 5,472,769 | 12/1995 | Goerz, Jr. et al. . | |

PROTECTIVE MATERIAL AND METHOD

TECHNICAL FIELD

This invention relates generally to protective material and more specifically to cut resistant material that also exhibits resistance to penetration of liquid.

BACKGROUND OF THE INVENTION

Cut resistant coated materials and garments made therefrom have been proposed consisting of a cut resistant outer shell coated with a rubber material and a cotton liner inserted inside the shell. Such garments are useful since they exhibit cut resistance and also retard the penetration of liquid, dirt, oil, blood and other fluids through the garment and into contact with the wearer. A known cut resistant coated glove comprises an outer shell knit from a composite yarn exhibiting cut resistance, an inner fabric liner within the shell, and a liquid impervious latex or nitrile coating applied to the outer shell by dipping the shell in a liquid bath of the coating material. The liquid penetrates through the outer shell, encapsulating the cut resistant yarn and bonding to the inner fabric liner. Solidification of the coating material adheres the shell to the liner.

The cut resistance of gloves constructed as described above is compromised due to the encapsulation of the yarn by the coating material. This encapsulation makes the cut resistant material rigid and unyielding. The encapsulated yarn is incapable of slipping or sliding against an applied cutting instrument. It is believed that this inability of the cut resistant yams to slip against the cutting instrument and against each other impairs the overall cut resistance of the coated glove or other protective garment so constructed. Further, the coated glove or other protective garment is stiff, relatively inflexible and uncomfortable to the wearer.

There is therefore a need for a cut resistant and liquid impervious material that is lightweight, flexible, comfortable, that can be manufactured easily and that does not cause the cut resistant yams to be encapsulated.

SUMMARY OF THE INVENTION

The present invention provides a cut resistant and liquid impervious composite material that can be used to form a protective garment such as a glove. The composite material of the present invention is liquid impervious, provides cut, abrasion and puncture resistance, and a non-slip gripping surface without sacrificing flexibility or comfort.

The composite material of the present invention comprises a base layer of cut resistant yarn, an intermediate layer of natural fiber and an outer layer of a flexible, liquid impervious elastomeric material. The cut resistant yam in the base layer is substantially free of encapsulation by the elastomeric material. The intermediate layer bonds with the elastomeric material, while the underlying cut resistant yams in the base layer remain free to slip against an applied cutting force and against themselves.

In the preferred embodiment, the elastomeric material in liquid form penetrates limited selected areas of the intermediate layer and passes through aligned portions of the base layer to encapsulate or partially encapsulate limited portions of the cut resistant yarn of the base layer. The area of penetration is minimized and the location of penetration is preselected to provide a simple and convenient means of adhering the intermediate layer and the base layer without encasing a significant amount of the cut resistant yarn in functional areas of a protective garment formed from the composite material of the present invention. Other means of adhering the base layer and the intermediate layer to each other by tacking, or stitching, gluing or otherwise joining the two layers together in a manner that does not compromise the flexibility, cut resistance and liquid resistance of the material can be practiced without departing from the intended scope of the present invention. Additionally, the elastomeric material of the outer layer may be selected to provide heat resistance in addition to retarding penetration of liquids.

Accordingly, the present invention provides a protective material comprising a base layer including cut resistant yarn, an intermediate layer including natural fiber, and an outer layer including a flexible, elastomeric material impervious to liquid. The intermediate layer bonds to the elastomeric material, while the cut resistant yarn remains substantially free of encapsulation by the elastomeric material. The intermediate layer is joined to the base layer at one or more location so that a major part of the base layers remains unattached to the intermediate layer.

The intermediate layer is preferably sufficiently absorbent to hold a coagulant for the elastomeric material in a liquid form and is sufficiently porous to permit the liquid elastomeric material to flow through the intermediate layer pores when selected areas of the intermediate layer are wetted with a surfactant. In this preferred embodiment, the elastomeric material extends through these selected areas and at least a portion of the base layer aligned with these selected areas, encapsulating at least a portion of the base layer cut resistant yarn and joining the intermediate layer to the base layer. In a glove formed from the protective material of the preferred embodiment, the selected areas are preferably no more than the knuckle area, the back portion of the fingertip area and the wrist cuff area.

In this preferred embodiment, the intermediate layer includes at least a predominance of cotton or wool and most preferably cotton. The yarn of the base layer preferably includes a core including at least one strand of flexible fully annealed stainless steel wire having a diameter from about 0.001 inch to about 0.01 inch and at least one strand of fiber having a denier from about 200 to about 1000, an inner fiber wrap having a denier from about 100 to about 1000 and an outer fiber wrap of polyamide or polyester having a denier from about 100 to about 1000, where at least one of the core fiber or the inner wrap is cut resistant fiber. The outer layer of this preferred embodiment includes acrylonitrile butadiene rubber.

A glove is made from the preferred protective material of the present invention by conforming the base layer and the intermediate layer in the shape of a glove and disposing the intermediate layer over the exterior of the base layer. The assembly is dipped into a coagulant bath and dried. A surfactant is sprayed on limited selected areas of the glove prior to dripping the assembly in a liquid elastomer material. The surfactant enables the liquid elastomer to penetrate through the selected areas of the intermediate layer, encapsulating the underlying cut resistant yarn and joining the intermediate and base layers in the selected areas.

The above and other features and advantages of the present invention will become better understood from the detailed description that follows, when considered in connection with the accompanying drawings.

BEST MODE FOR CARRYING OUT THE INVENTION

Figure 1:
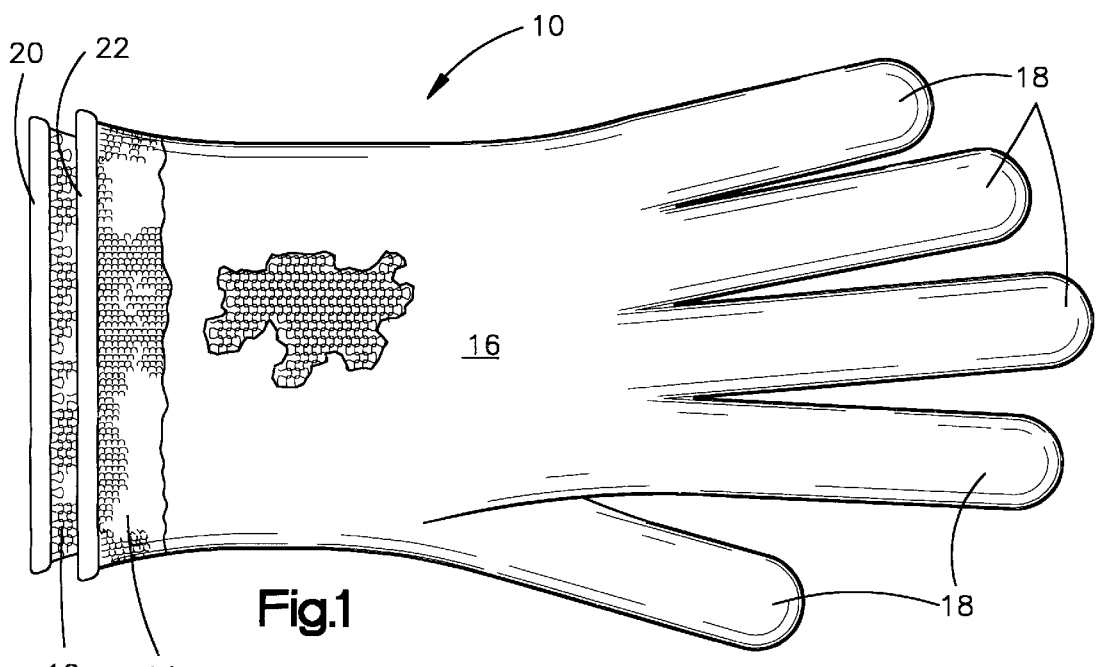
FIG. 1 is a front elevational view of a glove embodying the invention.

An article of protective apparel in the form of a glove 10 embodying the composite protective material of the present invention is shown in FIG. 1. The glove 10 is suitable for a range of uses where cut resistance is desired, such as where knives, glass or sharp metal pieces are being handled. It will be appreciated that it is important to provide a protective glove 10 enabling the wearer to maintain sufficient dexterity in environments where the wearer is gripping or otherwise using cutting tools. The glove 10 of FIG. 1 is also useful where exposure of the wearer to liquids, such as chemicals, is to be avoided. The composite material of the present invention is also useful in forming a variety of other protective garments, such as aprons, sleeves and gaiters.

The glove embodying the protective material of the present invention comprises a base layer 12 of cut resistant yarn preferably knitted into a textile material, an intermediate layer 14 of natural fiber material preferably knitted into a textile material, and a flexible elastomeric coating 16 that covers the finger stalls 18 of the glove and 10 substantially the entire outer surface of the glove with the exception of the wrist cuff area. Preferably, the wrist cuff 20 of the base layer 12 is sewed to the wrist cuff 22 of the intermediate layer 14 by overcast stitching (not shown).

The coating 16 is preferably applied by dipping the intermediate layer 14 mounted on the exterior of the base layer 12 into a bath of a suitable liquid elastomeric material. The liquid elastomeric material is allowed to solidify, bonding to the intermediate layer 14 and forming a liquid impervious outer layer 16. A coagulant applied to the exterior surface of the intermediate layer 14 mounted on the exterior of the base layer 12 prevents the liquid elastomeric material from penetrating through the intermediate layer 14 to contact the cut resistant yam 24 of the base layer 12. The base layer 12 comprising cut resistant yarn 24 remains essentially free of contact with the elastomeric material, thereby improving the cut resistance, flexibility and comfort of the glove 10.

Figure 2:
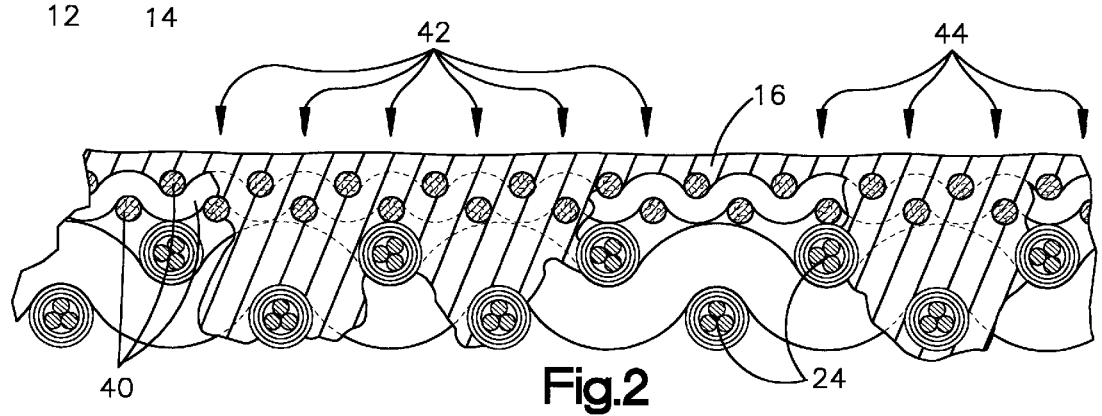
FIG. 2 is a diagrammatic sectional view through a portion of the glove of FIG. 1, showing the construction of the material of which the glove is made.

In the preferred embodiment, limited selected areas of the intermediate layer 14 are treated with a surfactant prior to coating that suppresses the coagulant and allows the liquid elastomeric material to penetrate through the selected areas to those portions of the base layer aligned with the intermediate layer selected areas. As seen in FIG. 2, a portion of this penetrating liquid at least partially encapsulates the cut resistant yarn 24 within the underlying portion of the base layer 12. This limited encapsulation in one or more selected areas joins the intermediate layer 14 to the base layer 12 without a noticeable sacrifice of cut resistance, flexibility or comfort.

As used herein, "cut resistant yarn" is any yarn that includes:

1) fiber having a tenacity greater than 10 grams per denier such as Kevlar, Spectra and Vectran HS;
2) fiber having a tensile modulus greater than about 200 pounds per square inch such as Kevlar, Spectra and Vectran M;
3) fiber having a hardness greater than about 3 Mohs on the hardness scale such as fiberglass;
4) fiber resistant to being cut through for at least about 10 cycles on the cut testing apparatus described in U.S. Pat. No. 4,864,852, incorporated herein by reference, with a cutting weight of 135 grams, mandrel speed of 50 rpm, steel mandrel diameter of 19 mm., blade drop height of 9 mm., using a single-edged industrial razor blade for cutting, where the fiber is tested as a knitted fabric comprised of 2400 denier fiber with less than two turns per inch twist and being knitted on a 10 gauge knitting machine to produce a fabric weight of about 11 ounces per square yard;
5) fiber having an average slash test load greater than five pounds using the slash test as described below, or
6) one or more strands of wire having an equivalent diameter of up to 0.01 inch. A fiber meeting any one of the above criteria is referred to herein as a "cut resistant fiber."

In the slash test the fiber is tested as a fabric knitted from yarn having a core, a first wrap wound at 10 turns per inch and a second wrap in the opposing direction of 10 turns per inch, the core and wraps all 650 denier multifilament strands. A sample of the fabric is manipulated so it is substantially flat and placed into a test fixture constructed to stretch the sample and load the yarn in the fabric to about a five pound tensile load. The sample and fixture are placed in an Instron model 4465 test machine and oriented at a 45° angle relative to the direction that a sharpened test blade is moved. The test blade is moved under load against the fabric in a straight line. The weight or load acting on the test blade against the fabric sample is variable.

The test blade for the slash test is carbide steel and has four sharpened and independent circumferentially spaced arcuate cutting sections. Each section of the test blade performs only one slash test. The test blade is removed and re-sharpened after all four sections perform a slash test. A test blade section is deemed "sharp" when a slash test load in the range of nine pounds to sixteen pounds causes the blade to cut through a standardized fabric using the above described procedure. The standardized fabric used is available from Bettcher Industries, Inc. under the name Handguard II. The Handguard II fabric is machine knitted two yarns in, five and one half needles per inch of a specific yarn of about 0.023 inch diameter. Each yarn has a core consisting of a multifilament strand of 375 denier Spectra 1000 fiber. Each yarn has oppositely wound helical wraps about the core. These wraps consist of, in the order set forth, a first and second wrap of a multifilament strand of 70 denier nylon fiber; a third wrap of one end of 0.0016 stainless steel; a fourth wrap of a multifilament strand of 400 denier Kevlar fiber; a fifth wrap of multifilament strand of 650 denier Spectra 900 fiber; and a sixth wrap of a multifilament strand of 440 denier polyester fiber.

The slash test is performed so that the loaded test blade engages the fabric sample three times. Each time, a new cutting section of the test blade is used and the blade engages a different portion of the fabric at a different orientation relative to a knit loop. The three test orientations are directly across a knit loop, directly along a knit loop, and diagonally across a knit loop. The load sufficient for the test blade to cut through each fabric sample in each of the three test directions is recorded. Ten readings in each of the three test directions for a total of 30 tests are averaged and referred to as the "average slash test load."

Figure 3:
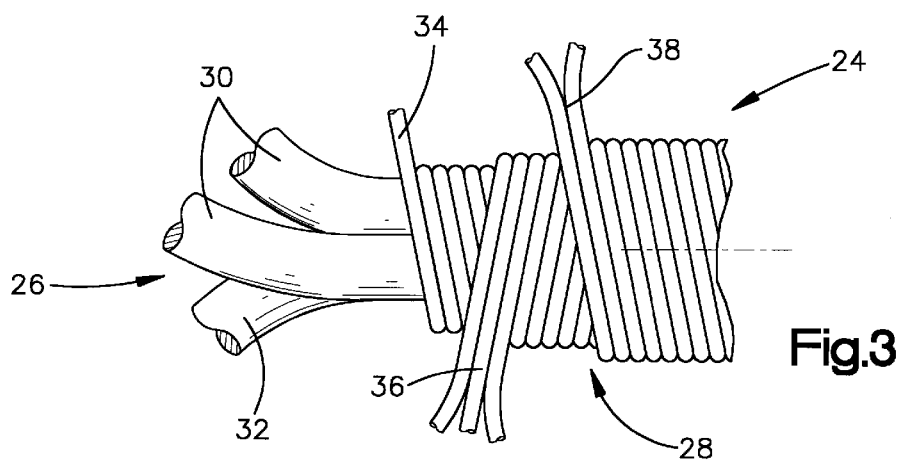
FIG. 3 is a partial elevational view showing the construction of a strand of yam of which the glove of FIG. 1 is made.

The preferred yarn 24 of the base layer 12 of the present invention is depicted in FIG. 3 and has a core 36 and two or more wraps 28. In the preferred embodiment the core 26 is formed of at least one wire strand 30 and at least one fiber strand 32, and most preferably two wire strands 30 extending parallel along the length of the yarn 24 with one parallel cut resistant fiber strand 32. The yarn 24 has at least two wraps 28 helically wound in opposing directions with one wrap being on top of the other wrap. At least one of the core fiber 32 and the inner wraps is a cut resistant fiber.

The wire 30 is flexible and strong and preferably highly corrosion resistant. Stainless steel, preferably No. 304 fully annealed, is particularly suited to the present invention. While the preferred embodiment uses two strands of wire 30 in the core 26, typically 2 to 6 strands will be used. The diameter of each wire strand is preferably 0.002 inch, but can range from about 0.001 to about 0.006 inch. The total equivalent diameter of the wire strands used in the core should not exceed 0.01 inch.

At least one fiber strand 32 in the core 26 is preferably a liquid crystal polymer cut resistant fiber having a denier of about 400. One such fiber is available under the trademark Vectran HS from Hoechst Celanese. That and other suitable cut resistant fibers, such as aramids or high strength extended chain polyethylenes can be used in the core 26 with a denier from about 200 to about 1000.

The preferred yarn has three wraps 28, two inner wraps 34, 36 and an outer wrap 38. The first inner wrap 34 is preferably a single end of cut resistant high modulus polyethylene fiber, or HMPE having a tenacity of about 15 grams per denier and a denier of about 360. Such a fiber is available under the trademark Certran from Hoechst Celanese. Other suitable cut resistant fibers can be used as an inner wrap 34, with a denier from about 200 to about 1000. The second inner wrap 36 is preferably three ends of polyester each end having a denier of about 70. The second inner wrap 36 is wound oppositely from the first inner wrap 34. The outer wrap 38 is preferably two ends of polyester each end having a denier of about 300. The outer wrap 38 is wound oppositely from the second inner wrap 36. Polyamide is also a suitable fiber for an outer wrap, in the denier range from about 100 to 1000.

While three wraps 28 totaling six ends are preferred, only two single end wraps are required and more than three wraps can be used. If cut resistant fiber is used as a wrap, it is preferable that this fiber be used as an inner wrap, and that polyester or polyamide be used as an outer wrap, since the polyester and polyamide provide greater comfort to the wearer than most cut resistant fiber. To balance tension in the yarn, it is desirable to have an even number of wrap ends, with half of the wrap ends wound in one direction and the other half wound in the opposite direction. In the preferred embodiment, the total number of wrap ends is six, with three each wrapped in opposing directions. While more than six wrap ends can be used, it is desirable that the total diameter of the yarn 24 be less than 0.05 inch to maintain flexibility in the end product and to facilitate use in conventional knitting machines.

The base layer 12 is preferably knit into a textile material for flexibility, comfort, seamless construction and efficiency of manufacture. The total diameter of the preferred yarn 24 is about 0.015 inch. It may be desirable to incorporate a microban into the cut resistant yarn 24 of the base layer 12, particularly for applications in the food industry, to inhibit the growth of fungus, streptococcus or other undesirable microorganisms.

The intermediate layer 14 of the protective material is preferably a knitted material of 8/1 spun cotton yarn 40, although spun cotton using about 2 to about 12 strands with an equivalent yarn size of about 2/1 to about 20/1 can be used. Other natural fibers such as wool that are capable of bonding with the elastomeric material can be used to form the intermediate layer 14 and are within the scope of the present invention.

In the preferred embodiment, the intermediate layer 14 is sufficiently absorbent to hold a coagulant for the liquid elastomeric material, and is sufficiently porous to permit liquid elastomeric material to flow through its pores when selected exterior areas of the intermediate layer are wetted with a surfactant. These properties of the intermediate layer 14 are preferred for ease in joining the base layer 12 and the intermediate layer 14 during manufacture. It is believed that the surfactant not only suppresses the activity of the coagulant, but also increases the wetting of the intermediate layer 14. As can be seen in FIG. 2, in those areas 42, 44 treated with surfactant prior to application of coating 16, limited amounts of the liquid elastomeric material that forms the coating 16 flow through the intermediate layer 14 and encapsulate at least a portion of the yarn 24 within the underlying portion of the base layer (hereinafter referred to as "strike through"), providing a simple method of joining the base 12 and intermediate layers 14. It should be appreciated that other methods of joining the intermediate layer 14 to the base layer 12 without causing substantially all of the cut resistant yarn 24 to be encapsulated by the liquid elastomeric material can be practiced, such as stitching or gluing the two layers together, without departing from the intended scope of the present invention.

The locations of the areas 42, 44 selected for strike through are carefully determined to avoid unnecessarily sacrificing the cut resistance and flexibility of the protective material. In the glove 10 embodying the preferred embodiment of the present invention, only the knuckle area, the back area of the fingertips and the cuff area are subjected to strike through, being generally perceived as areas requiring less flexibility and cut resistance than other functional areas of the glove such as the palm and fingers. The area of strike through is normally no more than 2–20% of the total exterior surface area of said intermediate layer 14. It will be understood that the particular use of the protective material of the present invention will have a significant impact on the location of the areas selected for strike through.

A glove embodying the protective material of the present invention is preferably made by providing the base layer in the form of a glove knitted from cut resistant yarn and placing it onto a hand form. The intermediate layer in the form of a glove of knitted cotton is placed over the exterior of the base layer. A coagulant solution, preferably 20 per cent calcium nitrate, is applied to the exterior of the intermediate layer to prevent any undesired strike through to the base layer, preferably by dipping the loaded form in a fingertip down position into a coagulant bath. Excess coagulant is removed preferably by dripping in a fingertip down position for about 5 minutes. The intermediate layer is dried, preferably in a hot oven, and then allowed to cool to approximately 75–80 degrees Fahrenheit. A suitable liquid elastomeric material is applied to the exterior of the intermediate layer, again preferably by dipping the loaded form in a fingertip down position into a bath.

It has been found that the coating is more evenly distributed if a series of successively deeper dips into the liquid elastomer is performed. In the case of a glove, a first dip to the thumb crotch is followed by a short drip period of about 30 seconds. A second dip covers substantially all of the glove, and is followed by a drip period of about 3 to 3.5 minutes to remove excess liquid coating material.

Preferably, a second coagulant dip into a stronger 40 per cent solution is performed after the coating dips are complete to gel any remaining liquid elastomeric material. The glove is then dipped into a water bath to remove excess coagulant, and is dried in an oven at about 200 degrees Fahrenheit until the coating of the outer layer is thoroughly dry, to prevent blistering of the coating at curing temperatures. The glove is then cured at about 220 to about 250 degrees Fahrenheit for about 30 to 45 minutes.

Suitable elastomeric materials for this method include acrylonitrile rubber, acrylonitrile butadiene rubber, nitrile butadiene rubber, nitrile silicone rubber, polychloroprene, polyvinyl chloride or polyisoprene. Acrylonitrile butadiene rubber is the preferred coating material to form the outer layer of the protective material. A preferred NBR latex coating material is available from Reichhold Chemical Company under their reference DT 3013. The preferred coating formulation combines 100 dry parts of this NBR latex with 3 dry parts zinc oxide dispersion agent and 1.5 dry parts pigment. Antifoam agents and 6% methocellulose thickener can be added as needed. Elastomeric coating materials imparting thermal resistance, as are available under the trademarks NOMEX or VITON can also be used.

A preferred coagulant is a solution of calcium nitrate, preferably 10 to 40 parts calcium nitrate in water with 1 part nonylphenoxypoly (ethyleneoxy) ethanol (available under the trademark IGEPAL C0-630), the solution having a specific gravity from about 1.06 to about 1.165, respectively, although other divalent salt solutions will also suffice. Those skilled in the art will appreciate that the concentration of the coagulant can be varied in different areas of the glove or other article, to accommodate the effects of hydrostatic pressure in the dipping process. For example, hydrostatic pressure may force the coating material to strike through the fingertip area of a glove coated by dipping in a fingers down position, unless a stronger concentration of coagulant is applied in this area. Hydrostatic pressure can force strike through even in those areas not treated with a surfactant. It will be understood that the choice of coagulant will depend on the coating material selected, as is known in the art.

If strike through is desired, selected exterior areas of the intermediate layer are wetted with a surfactant after the first coagulant dip and prior to coating. It is believed that most nonionic and anionic surfactants will suppress coagulants commonly used in the art of latex dipping and increase the wetting of the intermediate layer. An effective surfactant for the preferred calcium nitrate coagulant is a nonionic surfactant solution of about 10 parts IGEPAL C0-630 in water. The surfactant is preferably sprayed on the exterior of a warmed intermediate layer in those limited preselected areas where encapsulation of the cut resistant yarn facilitates attachment of the intermediate layer and the base layer without sacrificing flexibility and cut resistance.

After curing, appropriate finishing steps can be performed, such as overcast stitching the wrist cuffs together, or imprinting the glove or other article as desired.

From the above it will be apparent that a new and improved protective material is provided that is liquid impervious and has improved cut resistance and flexibility. Isolating cut resistant yarn from the elastomeric coating of the outer layer preserves the ability of the yarn to slip in the presence of a cutting force and therefore provide cut resistance, prevents the yarn from stiffening, and provides an improved liquid impervious material having improved comfort and flexibility. In an advantageous application of the present invention, selective strike through of the liquid elastomeric material to encapsulate cut resistant yarn in the base layer provides an effective method of joining the intermediate and base layers during the coating process without sacrificing the improved cut resistance and flexibility of the material.

While a preferred embodiment of the invention has been disclosed in detail, various modifications and alterations may be made therein without departing from the spirit and scope of the invention set forth in the appended claims.

We claim:

1. A protective material comprising:
   a base layer comprising cut resistant yarn;
   an intermediate layer comprising natural fiber;
   an outer layer comprising a flexible, elastomeric material impervious to liquid;
   said intermediate layer bonded to said elastomeric material;
   said cut resistant yarn substantially free of encapsulation by said elastomeric material;
   said intermediate layer joined to said base layer at one or more locations;
   said intermediate layer unattached to a major part of said base layer.

2. The protective material of claim 1 wherein said intermediate layer is sufficiently absorbent to hold a coagulant for said elastomeric material when said elastomeric material is in a liquid form and is sufficiently porous to permit said liquid elastomeric material to flow through said pores when selected areas of said intermediate layer are wetted with a surfactant, and wherein said elastomeric material extends through said selected areas and at least a portion of said base layer aligned with said selected areas and encapsulates at least a portion of said yarn within said base layer portion.

3. The protective material of claim 1 wherein said intermediate layer is joined to said base layer by stitching said layers together at one or more locations.

4. The protective material of claim 1 wherein said intermediate layer is joined to said base layer by gluing said layers together at one or more locations.

5. The protective material of claim 1 wherein said intermediate layer comprises at least a predominance of natural fiber selected from the following group: cotton or wool.

6. The protective material of claim 1 wherein said yarn comprises a core, one or more inner wraps and an outer wrap, with each of said wraps layered onto the previous wrap.

7. The protective material of claim 6 wherein said core comprises at least one strand of flexible fully annealed stainless steel wire having a diameter from about 0.001 inch to about 0.01 inch and at least one strand of fiber having a denier from about 200 to about 1000 and wherein an inner wrap is fiber having a denier from about 100 to about 1000 and an outer wrap is polyamide or polyester fiber having a denier from about 100 to about 1000, and wherein at least one of said core fiber or said inner wrap is cut resistant fiber.

8. The protective material of claim 7 wherein said core comprises one strand of cut resistant liquid crystal polymer having a denier of about 400 and two strands of wire each having a diameter of about 0.002 inch, a first inner wrap being a cut resistant high strength polyethylene having a denier of about 360, a second inner wrap being three ends of polyester each end having a denier of about 70, and said outer wrap being two ends of polyester each end having a denier of about 300.

9. The protective material of claim 1 wherein said base layer is a knitted fabric.

10. The protective material of claim 1 wherein said intermediate layer is adjacent said base layer and said outer layer.

11. The protective material of claim 1 wherein said outer layer comprises a material selected from the following group: acrylonitrile rubber, acrylonitrile butadiene rubber, nitrile butadiene rubber, nitrile silicone rubber, polychloroprene, polyvinyl chloride, polyisoprene, Nomex or Viton.

12. The protective material of claim 1 wherein said outer layer is impervious to liquid.

13. The protective material of claim 1 wherein said protective material forms an article of apparel.

14. The article of apparel of claim 13 wherein said article of apparel is a glove.

15. The protective material of claim 2 wherein said protective material forms a glove and said selected areas include no more than the knuckle area, the back portion of the fingertip area, and the wrist cuff area.

16. The protective material of claim 2 wherein said selected areas include no more than 2–20% of the total exterior surface area of said intermediate layer.

17. The protective material of claim 16 wherein said protective material forms a glove.

18. A method of making an article that includes protective material having a base layer comprising cut resistant yarn, an intermediate layer comprising natural fiber and an outer layer comprising a flexible, liquid impervious elastomeric material, said method comprising the steps of:

providing said base layer in the form of textile fabric;

conforming said base layer in the shape of said article;

providing said intermediate layer in the form of textile fabric capable of bonding with said elastomeric material and sufficiently absorbent to hold a coagulant for said elastomeric material when said elastomeric material is in a liquid form;

conforming said intermediate layer in the shape of said article;

disposing said intermediate layer over the exterior of said base layer;

attaching said intermediate layer and said base layer at one or more locations;

applying said coagulant to said intermediate layer and drying said intermediate layer;

providing said elastomeric material in liquid form;

coating said dried intermediate layer with said liquid elastomeric material to form said outer layer;

solidifying said liquid elastomeric material to form said outer layer.

19. The method of claim 18 wherein said method further comprises applying a surfactant to selected exterior areas of said intermediate layer after applying said coagulant and prior to coating said intermediate layer with said liquid elastomeric material, said surfactant allowing said liquid elastomeric material to flow through at least a portion of said selected areas and at least a portion of said base layer underlying said selected areas and encapsulate at least a portion of said yarn within said base layer portion.

20. The method of claim 18 wherein said intermediate layer and said base layer are attached by stitching said intermediate layer to said base layer.

21. The method of claim 18 wherein said intermediate layer and said base layer are attached by gluing said intermediate layer to said base layer.

22. The method of claim 18 wherein said coagulant is applied to said intermediate layer by dipping said intermediate layer mounted on said base layer into said coagulant and wherein said intermediate layer is coated by dipping said intermediate layer mounted on said base layer into said liquid elastomeric material.

23. The method of claim 19 wherein said coagulant is applied to said intermediate layer by dipping said intermediate layer mounted on said base layer into said coagulant and wherein said intermediate layer is coated by dipping said intermediate layer mounted on said base layer into said liquid elastomeric material.

24. The method of claim 22 wherein said article is a glove and said dipping is performed in a fingers down position.

25. The method of claim 23 wherein said article is a glove and said dipping is performed in a fingers down position.

26. The method of claim 25 wherein said selected exterior areas include no more than the knuckle area, the back of the fingertips and the wrist cuff area of said glove.

27. The method of claim 25 wherein said selected areas include no more than 2–20% of the total exterior surface area of said intermediate layer.

28. The method of claim 19 wherein said article is a glove and said surfactant is applied by spraying said selected areas.

29. The method of claim 18 wherein said article is a glove having a cuff edge and said method further comprises sewing said base layer and said intermediate layer together at said cuff edge.

30. The method of claim 18 wherein said method further comprises applying a second application of said coagulant to said coated intermediate layer prior to solidifying said liquid elastomeric material, wherein said second coagulant concentration exceeds said first coagulant concentration.

31. The method of claim 19 wherein said coagulant is a divalent salt solution, and said surfactant is an nonionic or anionic surfactant solution.

32. The method of claim 31 wherein said divalent salt solution is from about 10 parts to about 40 parts calcium nitrate, from about 90 parts to about 60 parts water, and about 1 part nonylphenoxypoly (ethyleneoxy) ethanol and said surfactant is a nonionic surfactant solution of about 10 parts nonylphenoxypoly (ethyleneoxy) ethanol in 90 parts water.

* * * * *